United States Patent Office 2,897,227
Patented July 28, 1959

2,897,227

S-(CHLOROPHENYL) O,O-DIALKYL PHOSPHORO-DITHIOATES

Harold R. Slagh, Midland, Mich., assignor to The Dow Chemical Company, Midland, Mich., a corporation of Delaware No Drawing. Application April 4, 1956
Serial No. 575,962

5 Claims. (Cl. 260—461)

This invention is concerned with the S-(chlorophenyl) O,O-dialkyl phosphorodithioates having the formula

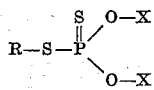

In this and succeeding formulas, R represents a chlorophenyl radical and X represents methyl or ethyl. These new compounds are colorless or light yellow liquids, somewhat soluble in many organic solvents and of very low solubility in water. They have been found to be active as parasiticides and are adapted to be employed as active toxic constituents of compositions for the control of bacteria, mites and insect organisms such as the Mexican bean beetle and houseflies.

The new compounds may be prepared by reacting an alkali metal methylate or alkali metal ethylate with an S-(chlorophenyl) phosphorodichloridodithioate of the formula

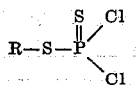

The reaction is carried out in an inert organic solvent such as benzene, toluene, methylene dichloride or carbon tetrachloride and conveniently in the alcohol employed in the preparation of the alcoholate. Good results are obtained when employing two molecular proportions of the alkali metal alcoholate with each molecular proportion of the phosphorodichloridodithioate reagent. In practice, the alcoholate employed is preferably the sodium salt and may be prepared by reacting the corresponding alcohol with sodium. The reaction between the alcoholate and the phosphorodichloridodithioate is somewhat exothermic and takes place smoothly at temperatures of from —10° to 60° C. The temperature may be controlled by regulating the rate of contacting the reactants as well as by external cooling. Upon completion of the reaction, the desired product may be separated in conventional fashion.

In carrying out the reaction, the alkali metal alcoholate is contacted portionwise with the phosphorodichlorido-dithioate reagent dissolved in the reaction solvent. The latter operation is carried out with stirring and at a temperature of from —10° to 60° C. Upon completion of the reaction, the solvent may be removed by evaporation, the residue dissolved in a water-immiscible solvent such as methylene dichloride or benzene and the solvent solution washed with water. The solvent is then removed by fractional distillation under reduced pressure to obtain the desired product as a liquid residue.

In an alternative method, the new compounds may be prepared by reacting an alkali metal salt of a chlorobenzenethiol (alkali metal-S—R) with an O,O-dialkyl phosphorochloridothioate having the formula

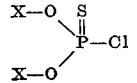

The reaction is carried out in one of the heretofore mentioned inert organic solvents and preferably with the sodium salt of the chlorobenzenethiol. The contacting of the reagents, conditions of reaction and separation of the desired product are all as previously described.

The following examples illustrate the invention but are not to be construed as limiting.

EXAMPLE 1

*S-(4-chlorophenyl) O,O-dimethyl phosphorodithioate*

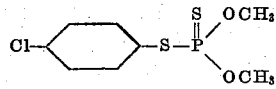

Sodium (3.31 grams, 0.144 mole) was dissolved in 100 milliliters of methanol to prepare a methanol solution of sodium methylate. This solution was added portionwise with stirring to 20 grams (0.072 mole) of S-(4-chlorophenyl) phosphorodichloridodithioate dispersed in 25 milliliters of methanol. The addition was carried out over a period of 30 minutes and at a temperature of from 10° to 20° C. Stirring was thereafter continued for one hour at room temperature to complete the reaction. The methanol was then removed by evaporation and the residue diluted with benzene and washed with water. The washed mixture was thereafter fractionally distilled under reduced pressure to separate the benzene and obtain an S-(4-chlorophenyl) O,O-dimethyl phosphorodithioate product as a colorless liquid. This product has a specific gravity of 1.3819 at 25° C. and a refractive index $n$/D of 1.6013 at 25° C.

EXAMPLE 2

*S-(4-chlorophenyl) O,O-diethyl phosphorodithioate*

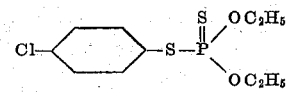

Sodium (0.144 mole) was dissolved in 100 milliliters of ethanol to prepare an ethanol solution of sodium ethylate. This solution was added portionwise with stirring to 0.072 mole of S-(4-chlorophenyl) phosphorodichloridodithioate dispersed in 25 milliliters of ethanol. The addition was carried out in 30 minutes and at a temperature of from 10° to 20° C. After the addition, the mixture was stirred for one hour at room temperature to complete the reaction. The reaction mixture was then processed as described in Example 1 to obtain an S-(4-chlorophenyl) O,O-diethyl phosphorodithioate product as a viscous liquid having a specific gravity of 1.2455 at 25° C. and a refractive index $n$/D of 1.5697 at 25° C.

EXAMPLE 3

*S-(2,5-dichlorophenyl) O,O-diethyl phosphorodithioate*

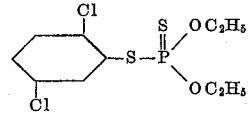

2,5-dichlorobenzenethiol (17.9 grams, 0.1 mole) and 2.3 grams (0.1 mole) of sodium was dissolved in 150 milliliters of methanol to prepare a methanol solution of the sodium salt of 2,5-dichlorobenzenethiol. This solution was added gradually with stirring to 18.85 grams (0.1 mole) of O,O-diethyl phosphorochloridothioate. The addition was carried out over a period of 20 minutes and at a temperature of from 25° to 33° C. After the addition, the mixture was stirred at 35° to 38° C. for three hours to complete the reaction. The methanol was removed by evaporation and the residue diluted with benzene and washed with water. Upon evaporation of the solvent, there was obtained an S-(2,5-dichlorophenyl)

O,O-diethyl phosphorodithioate product as a light yellow liquid having a specific gravity of 1.3234 at 25° C. and a refractive index n/D of 1.5663 at 25° C.

EXAMPLE 4

S-(2,4,5-trichlorophenyl) O,O-diethyl phosphorodithioate

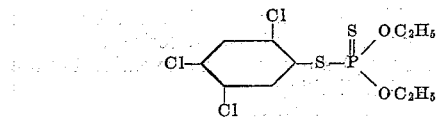

2,4,5-trichlorobenzenethiol (21.35 grams, 0.1 mole) and 2.3 grams (0.1 mole) of sodium was dissolved in 150 milliliters of methanol to prepare a methanol solution of the sodium salt of 2,4,5-trichlorobenzenethiol. This solution was added portionwise with stirring to 18.85 grams (0.1 mole) of O,O-diethyl phosphorochloridothioate. The addition was carried out in 30 minutes and at a temperature of from 5° to 10° C. After the addition, the mixture was stirred and heated at 30° to 35° C. for 1.5 hours to complete the reaction. The reaction mixture was then processed as described in Example 3 to obtain an S-(2,4,5-trichlorophenyl) O,O-diethyl phosphorodithioate product as a viscous liquid having a specific gravity of 1.3442 at 25° C. and a refractive index n/D of 1.5511 at 25° C.

The S-(chlorophenyl) phosphorodichloridodithioates employed as starting materials may be prepared by reacting a molecular excess of phosphorus thiochloride (PSCl₃) with a suitable chlorobenzenethiol in the presence of anhydrous magnesium chloride as catalyst. Good results are obtained when employing from five to ten moles of phosphorus thiochloride per mole of the benzenethiol reagent. In carrying out the reaction, the reactants and catalyst are mixed together and warmed until the evolution of hydrogen chloride of reaction is substantially complete. The reaction mixture is then filtered to remove the catalyst and the filtrate fractionally distilled under reduced pressure to separate the product.

The new S-(chlorophenyl) O,O-dialkyl phosphorodithioates are effective as parasiticides and are adapted to be employed for the control of household and agricultural pests. For such use the products may be dispersed on a finely divided carrier and employed as dusts. The new products may also be employed in oils, as constituents in water emulsions or in water dispersions. In a representative operation, 100 percent controls of houseflies and Mexican bean beetles have been obtained with aqueous compositions containing 100 parts by weight of S-(4-chlorophenyl) O,O-diethyl phosphorodithioate per million parts by weight of aqueous composition.

I claim:

1. An S-(chlorophenyl) O,O-dialkyl phosphorodithioate having the formula

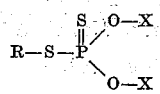

wherein R represents a chlorophenyl radical and X represents a member of the group consisting of methyl and ethyl.

2. S-(4-chlorophenyl) O,O-dimethyl phosphorodithioate.
3. S-(4-chlorophenyl) O,O-diethyl phosphorodithioate.
4. S-(2,5-dichlorophenyl) O,O-diethyl phosphorodithioate.
5. S-(2,4,5-trichlorophenyl) O,O-diethyl phosphorodithioate.

References Cited in the file of this patent

UNITED STATES PATENTS

| | | |
|---|---|---|
| 2,494,126 | Hoegberg | Jan. 10, 1950 |
| 2,494,283 | Cassaday et al. | Jan. 10, 1950 |
| 2,690,450 | Gilbert et al. | Sept. 28, 1954 |
| 2,761,806 | Boyer | Sept. 4, 1956 |
| 2,766,170 | Buntin et al. | Oct. 9, 1956 |
| 2,793,224 | Fancher | May 21, 1957 |

FOREIGN PATENTS

| | | |
|---|---|---|
| 969,440 | France | Dec. 20, 1950 |
| 257,649 | Switzerland | May 2, 1949 |

OTHER REFERENCES

Germany, F 17452, IV b/12₀, Mar 22, 1956.